US006845237B2

(12) United States Patent
Moulsley

(10) Patent No.: US 6,845,237 B2
(45) Date of Patent: Jan. 18, 2005

(54) METHOD FOR THE COMMUNICATION OF INFORMATION AND APPARATUS EMPLOYING THE METHOD

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 280 days.

(21) Appl. No.: 09/969,095

(22) Filed: Oct. 2, 2001

(65) Prior Publication Data
US 2002/0042283 A1 Apr. 11, 2002

(30) Foreign Application Priority Data

Oct. 9, 2000 (GB) .............................................. 0024697
Jun. 22, 2001 (GB) .............................................. 0115332

(51) Int. Cl.$^7$ ................................................ H04Q 7/20
(52) U.S. Cl. ..................................... 455/422; 455/13.4
(58) Field of Search ............................. 455/455, 456.2, 455/458, 8, 9, 10, 13.4, 18, 21, 504, 509, 510, 515, 516, 522, 701, 571, 574, 127.5, 517; 714/758, 776

(56) References Cited

U.S. PATENT DOCUMENTS

| 5,345,596 | A | * | 9/1994 | Buchenhorner et al. ..... 455/450 |
| 5,461,639 | A | * | 10/1995 | Wheatley et al. ........... 370/342 |
| 5,465,399 | A | * | 11/1995 | Oberholtzer et al. .......... 455/69 |
| 5,722,051 | A | * | 2/1998 | Agrawal et al. ............... 455/69 |
| 6,101,168 | A | | 8/2000 | Chen et al. .................. 370/228 |
| 6,519,223 | B1 | * | 2/2003 | Wager et al. ................ 370/216 |

FOREIGN PATENT DOCUMENTS

WO WO0019634 4/2000 .......... H04B/7/005
WO WO0019634 4/2000 .......... H04B/7/005

OTHER PUBLICATIONS

By Matthew P.J. Baker & Timothy J. Moulsley, Entitled: Power Control in UMTS release '99, Mobile Communication Technologies, Conference Publication No. 471, Philips Research Laboratories, UK 1999, pp. 36–40.

* cited by examiner

Primary Examiner—Jean Gelin
(74) Attorney, Agent, or Firm—Dicran Halajian

(57) ABSTRACT

A method of transferring information in units over a wireless digital communications link between a transmitting station and a receiving station comprising the steps of: transmitting first information units at a first energy level; monitoring if correct reception of the transmitted units occurred; and transmitting second information units associated with the first information units, for which first information units the monitoring did not indicate correct reception occurred, at second energy levels, the second information units allowing the content of the first information units to be established, wherein at least one of the associated second information units is transmitted at an energy level which is selected at least partly so as to minimise the total transmitted energy when averaged over a series of first information unit transmissions with respective second information unit transmissions. At least one of the second information units may be transmitted with an energy level below the energy level used in transmission of the first information units. Second information units may be transmitted with a redundancy content which is selected to at least partly minimize the total redundant data content when averaged over a series of first information unit transmissions with respective second information unit transmissions.

25 Claims, 3 Drawing Sheets

METHOD FOR THE COMMUNICATION OF INFORMATION AND APPARATUS EMPLOYING THE METHOD

The present invention relates to digital communication systems and more particularly to the exchange of information over wireless digital communication links of varying quality. In comparison to links which are wired, a greater variation in quality is usually observed in wireless links, for example the radio links found in a cellular mobile radio telephone system between mobile telephones and basestations. The present invention relates in particular, but not exclusively, to code division multiple access (CDMA) systems as used in so called third generation mobile telecommunications systems such as the Universal Mobile Telecommunications System (UMTS).

Communication systems, including mobile telecommunication systems and networks are making increasing use of digital technology. Such networks require a wireless radio communication link to be established between a mobile terminal and a basestation (or fixed terminal). Second and third generation mobile telephone systems exchange digital signals over the wireless radio communications link.

Digital systems can be exploited to provide greater spectral efficiency of a radio communications link than is offered by an analogue system and digital processing can often minimise the effects of interference.

In communication systems that rely on wireless links, such as mobile communications systems, the quality of these links can vary considerably. A number of factors influence the quality of the link and the system must be tolerant of any such variation. In systems employing an analogue link, a reduction in link quality may merely result in a noisy but tolerable link being established. However, in systems employing a digital link, it is important that the information sent over the link can be faithfully recovered at the receiving end, even when the link quality is poor. The effect of incorrectly received information depends on the application. For example, in the case of a digital cellular mobile radio telephone system employing a wireless radio link, during a telephone conversation, incorrect reception and loss of information over the link may just result in a temporary muting of sound. However, with the advent of mobile computing, mobile telephone cellular networks are increasingly used for the communication of data and in this situation any loss of data is unacceptable.

Various techniques are known for assisting with correct communication of digital information over a range of media and some of these techniques fall into the category of error detection and correction. One technique is forward error correction (FEC) which involves encoding information prior to transmission in such a way that any errors occurring during communication may be identified and corrected on reception. Another technique is to employ an automatic repeat request (ARQ) error control scheme which involves the retransmission of information that is deemed to have been erroneously received or not received at all. There are various derivatives of the basic ARQ scheme and these are employed depending on the feasibility of providing buffer space at the transmit/receive ends of the link and the requirement to utilise the link efficiently. Indeed some ARQ schemes do not merely retransmit the same information. In the case of these schemes retransmission involves the (re) transmission of only a portion of the information, transmission of appropriate FEC information or any combination thereof. Various ARQ schemes are well known to the person skilled in the art, as is the fact that retransmission may be initiated in the absence of an acknowledgement that information has been received correctly or even incorrectly. This is in contrast to the situation where an explicit request for retransmission is sent to the transmitter. When FEC and ARQ techniques are combined they can provide a powerful error detection and correction mechanism and in certain implementations ARQ operation only becomes active if FEC fails to recover information. However both techniques are most effective when the quality of the link is more predictable and consistent as may be provided, for example, by a co-axial cable, although wired twisted pair links are susceptible to noise and interference. In contrast, wireless radio communication links, such as those employed between mobile terminals and fixed terminals have a link quality which is constantly changing due to, for example movement (should the terminal be mobile), obstructions caused by buildings, the geography of the area, weather conditions and the distance of the wireless link. The onset of interference can also affect the link quality. In particularly poor conditions ARQ techniques will result in multiple retransmissions occurring which may cause a delay in data communication and an overall increase in system power consumption. Where components of the system, for example mobile terminals, rely on battery power this is particularly undesirable.

Where the radio link quality deteriorates because of large signal fluctuations, for example at the onset of a deep fade, various prior art remedies have been proposed to deal with reception failure, including the measures of shifting down of transmission rates and increasing the overall transmission power.

In a radio system such as UMTS the main aim of providing an ARQ scheme is to maximise throughput, while minimising the use of system radio frequency (RF) resources such as power and duration of transmission. It is also desirable to minimise parameters such as interference caused to other users, end-to-end delay of transmissions, implementation complexity and additional consumption of network transmission capacity. These are all longstanding issues.

Published international patent application WO-A-00/19634 filed in the name of Koninklijke Philips Electronics N.V. describes an ARQ scheme where the transmission power level of re-transmitted information packets may be increased with respect to the transmission power level used for corresponding earlier (original) packet transmissions. The motivation for doing this is to reduce the probability of unsuccessful reception of the re-transmitted information packets. This allows information packets to be sent initially with a lower power level than would be the case in an arrangement not benefiting from this scheme, whilst still maintaining a given probability of packet reception failure overall. For this reason, it is also possible to reduce the total transmitted energy, that is, the sum of energy arising from the first transmission and any retransmissions. In certain cases this can mean a reduction of interference caused to other users. This scheme also reduces the probability of a large number of repeat transmissions occurring, which would constitute a sub-optimal manner of communication for a number of reasons, including delays in information transfer.

While the above scheme goes some way to providing an increase in the probability of correct data reception on retransmission whilst simultaneously seeking to regulate the interference caused to other users, it is an object of the present invention to improve on such operation, particularly with respect to CDMA systems such as UMTS.

In accordance with a first aspect of the present invention there is provided a method of transferring information in units over a wireless digital communications link between a transmitting station and a receiving station comprising the steps of:

transmitting first information units at a first energy level;

monitoring if correct reception of the transmitted units occurred; and transmitting second information units associated with the first information units, for which first information units the monitoring did not indicate correct reception occurred, at second energy levels, the second information units allowing the content of the first information units to be established, wherein at least one of the associated second information units is transmitted at an energy level which is selected at least partly so as to minimise the total transmitted energy when averaged over a series of first information unit transmissions with respective second information unit transmissions.

At least one of the second information units may be transmitted with an energy level below the energy level used in transmission of the first information units.

The method may further comprise the step of combining first information units received at the receiving station and associated second information units received at the receiving station so that the received energy of the or each second information unit transmissions supplements the received energy of the first and any previous second information unit transmissions, the step of combining being performed such that the total energy of the combined received transmissions increases with each second information unit transmission event.

Optionally, for a given first information unit transmission, associated consecutive second information unit transmission events can be performed with a progressive increase in transmission energy with respect to one another.

Optionally, the first and any associated consecutive second information unit transmission events are each performed with a transmission energy such that the total transmission energy obtained by combining the first and any second information unit transmission events increases in value substantially exponentially.

The first and any associated consecutive second information unit transmission events may each be performed with a transmission energy such that the total transmission energy obtained by combining the first and any second information unit transmission events substantially conforms to the expression $E.k^{n-1}$ where E is the transmission energy used for the first information unit transmission event, k is a constant and n is the individual information unit transmission event where n=1 in the case of the first information unit transmission event and n=2, 3, 4, . . . n for each consecutive second information unit transmission event respectively. Optionally, k=1.4.

For each second information unit transmission event, the second information units can be transmitted with second energy levels selected partly on the basis of a target quality of reception parameter for each said second information unit. In this case, the said target quality of reception parameter for each second information unit may be calculated as a function of at least one previous target or actual quality of reception parameter.

The said target quality of reception parameter for each second information unit may be calculated as a function of the energy received due to transmission of the information units.

The quality of reception parameter may be the signal to interference (SIR) ratio.

The target quality of reception parameter for at least one of the second information units may be set so as to result in the reception of less energy from the transmission of said at least one second information unit than the energy received from the transmission of a first information unit.

For a given first information unit transmission, target quality of reception parameters for associated consecutive second information unit transmission events can be set so as to yield a progressive increase in received energy with respect to one another.

Optionally, the first and any associated consecutive second information unit transmission events are each performed with target quality of reception parameters such that the total received energy obtained by combining the first and any second information unit transmission events increases in value substantially exponentially.

The first and any associated consecutive second information unit transmission events may each be performed with target quality of reception parameters such that the total received energy obtained by combining the first and any second information unit transmission events substantially conforms to the expression $E.k^{n-1}$ where E is the received energy from the first information unit transmission event, k is a constant and n is the individual information unit transmission event where n=1 in the case of the first information unit transmission event and n=2, 3, 4, . . . n for each consecutive second information unit transmission event respectively. Optionally, k=1.4.

The target quality of reception parameter for at least one of the second information units can be set so as to yield a lower actual quality of reception parameter from the transmission of said at least one second information unit than the actual quality of reception parameter of a first information unit.

For a given first information unit transmission, target quality of reception parameters for associated consecutive second information unit transmission events can be set so as to yield a progressive increase in actual quality of reception parameter with respect to one another.

Optionally, the first and any associated consecutive second information unit transmission events are each performed with target quality of reception parameters such that the total quality of reception parameter obtained by combining the first and any second information unit transmission events increases in value substantially exponentially.

The first and any associated consecutive second information unit transmission events may each be performed with target quality of reception parameters such that the total quality of reception parameter obtained by combining the first and any second information unit transmission events substantially conforms to the expression $E.k^{n-1}$ where E is the received energy from the first information unit transmission event, k is a constant and n is the individual information unit transmission event where n=1 in the case of the first information unit transmission event and n=2, 3, 4, . . . n for each consecutive second information unit transmission event respectively. Optionally, k=1.4.

The method may further comprise the step of analysing the disparity between the actual and target quality of reception parameters of received information unit transmissions and decreasing the information unit transmission power level during transmission of said information unit if the quality of reception parameter for said received information unit transmission is greater than the target quality of reception parameter, otherwise increasing the information unit transmission power level during transmission of said information unit if the quality of reception parameter for said received information unit transmission is less than the target quality of reception parameter.

The preset first information unit quality of reception parameter, which may be preset, can be chosen on the basis of a target bit error rate or block error rate in the information received at the receiving station by virtue of first information units.

The communications link can be established by equipment operating in accordance with a communications protocol based on the Universal Mobile Telecommunication System. The communications link may be established on at least one physical channel. Optionally, the receiving station sends transmission power regulation commands to the transmitting station in the transmit power control (TPC) field carried on a control channel set up in the communications link. The transmit energy of the information units can be governed at least in part by adjusting the scaling factor between control and data channel transmit powers.

The target quality of reception parameter for first information units may be selected to correspond to a defined probability of failed first information units transmission and consequent second information units transmission.

The transmission energy level of the first information units may be subject to an upper limit. The transmission energy level of the second information units may be subject to an upper limit. In this case, the upper limit of the transmission energy level of the second information units may be different to the upper limit of the transmission energy level of the first information units.

In accordance with a second aspect of the present invention there is provided a digital wireless communication system comprising at least one transmitter having means for transmitting first information units at a first power level;

at least one receiver having means for receiving the transmitted information units; and monitoring means for monitoring if correct reception of the transmitted units occurred;

wherein the transmitting means transmits second information units associated with the first information units, for which first information units the monitoring did not indicate correct reception occurred, at second energy levels, the second information units allowing the content of the first information units to be established, and further wherein at least one of the associated second information units is transmitted at an energy level which is selected at least partly so as to minimise the total transmitted energy when averaged over a series of first information unit transmissions with respective second information unit transmissions.

In accordance with a third aspect of the present invention there is provided a transmitter station for digital wireless transmission of traffic information to a receiver, said transmitter station having:

a transmitter for transmitting first information units at a first energy level; and monitoring means for monitoring if correct reception of the transmitted units occurred;

wherein the transmitter transmits second information units associated with the first information units, for which first information units the monitoring means did not indicate correct reception occurred, at second energy levels, the second information units allowing the content of the first information units to be established, and further wherein at least one of the associated second information units is transmitted at an energy level which is selected at least partly so as to minimise the total transmitted energy when averaged over a series of first information unit transmissions with respective second information unit transmissions.

In accordance with a fourth aspect of the present invention there is provided a receiver for use in a digital wireless communication system comprising at least one transmitter having means for transmitting first information units at a first power level; the receiver having means for receiving the transmitted information units; and monitoring means for monitoring if correct reception of the transmitted units occurred;

wherein the transmitting means transmits second information units associated with the first information units, for which first information units the monitoring did not indicate correct reception occurred, at second energy levels, the second information units allowing the content of the first information units to be established, and further wherein at least one of the associated second information units is transmitted at an energy level which is selected at least partly so as to minimise the total transmitted energy when averaged over a series of first information unit transmissions with respective second information unit transmissions.

In accordance with a fifth aspect of the present invention there is provided a method of transferring information in units over a wireless digital communications link between a transmitting station and a receiving station comprising the steps of:

transmitting first information units with a first redundancy content;

monitoring if correct reception of the transmitted units occurred; and transmitting second information units associated with the first information units, for which first information units the monitoring did not indicate correct reception occurred, with a second redundancy content, the second information units allowing the content of the first information units to be established, wherein at least one of the associated second information units is transmitted with a data redundancy content which is selected at least partly so as to minimise the total redundant data content when averaged over a series of first information unit transmissions with respective second information unit transmissions.

At least one of the second information units may be transmitted with a data redundancy content below the redundant data content level used in transmission of the first information units.

The method may further comprise the step of combining first information units received at the receiving station and associated second information units received at the receiving station.

For a given first information unit transmission, associated consecutive second information unit transmission events can be performed with a progressive increase in redundant data content with respect to one another.

Optionally, the first and any associated consecutive second information unit transmission events are each performed with a redundancy data content such that the total redundancy data content obtained by combining the first and any second information unit transmission events increases in value substantially exponentially.

The first and any associated consecutive second information unit transmission events may each be performed with a redundancy data content such that the amount of additional redundancy to be added at the nth transmission is given by the expression $B.k^{n-1} - B.k^{n-2}$ where B is the total number of bits sent in the first transmission and n is the individual information unit transmission event where n=1 in the case of the first information unit transmission event and n=2, 3, 4, . . . n for each consecutive second information unit transmission event respectively.

In accordance with a sixth aspect of the present invention there is provided a digital wireless communication system comprising at least one transmitter having means for transmitting first information units with a first redundancy content;

at least one receiver having means for receiving the transmitted information units; and monitoring means for monitoring if correct reception of the transmitted units occurred;

wherein the transmitting means transmits second information units associated with the first information units, for which first information units the monitoring did not indicate correct reception occurred, with a second redundancy content, the second information units allowing the content of the first information units to be established, and further wherein at least one of the associated second information units is transmitted with a data redundancy content which is selected at least partly so as to minimise the total redundant data content when averaged over a series of first information unit transmissions with respective second information unit transmissions.

In accordance with a seventh aspect of the present invention there is provided a transmitter station for digital wireless transmission of traffic information to a receiver, said transmitter sation having:

a transmitter for transmitting first information units with a first redundancy content; and monitoring means for monitoring if correct reception of the transmitted units occurred;

wherein the transmitter transmits second information units associated with the first information units, for which first information units the monitoring means did not indicate correct reception occurred, with a second redundancy content, the second information units allowing the content of the first information units to be established, and further wherein at least one of the associated second information units is transmitted with a data redundancy content which is selected at least partly so as to minimise the total redundant data content when averaged over a series of first information unit transmissions with respective second information unit transmissions.

In accordance with an eighth aspect of the present invention, there is provided a receiver for use in a digital wireless communication system comprising at least one transmitter having means for transmitting first information units with a first redundancy content, the receiver having means for receiving the transmitted information units; and monitoring means for monitoring if correct reception of the transmitted units occurred;

wherein the transmitting means transmits second information units associated with the first information units, for which first information units the monitoring did not indicate correct reception occurred, with a second redundancy content, the second information units allowing the content of the first information units to be established, and further wherein at least one of the associated second information units is transmitted with a data redundancy content which is selected at least partly so as to minimise the total redundant data content when averaged over a series of first information unit transmissions with respective second information unit transmissions.

These and other aspects and other optional features appear in the appended claims which are incorporated herein by reference and to which the reader is now referred, The invention will now be described by way of example only with reference to the accompanying drawings, wherein FIG. 1 is a schematic representation of a typical cellular mobile radio telephone communications system employing at least one wireless radio communications link;

Figure 1:
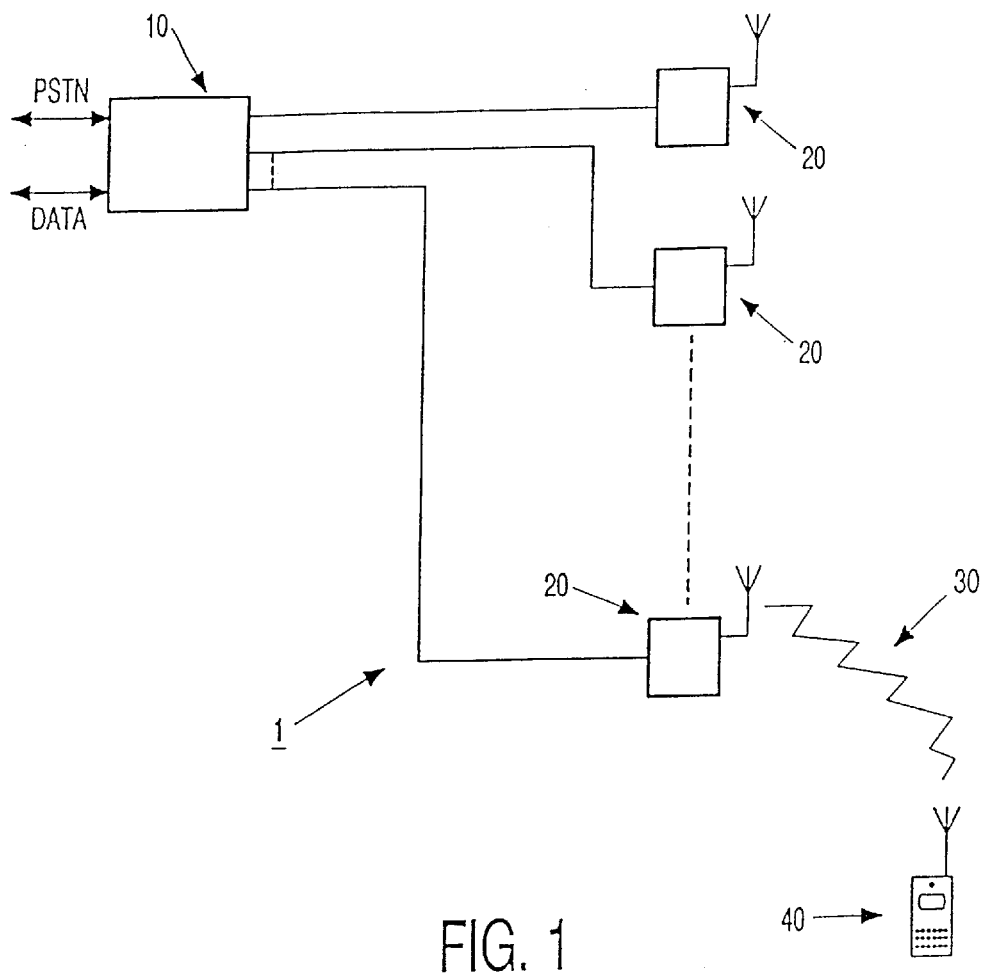

Referring to FIG. 1, a communications system 1 in the form of a cellular mobile radio telephone system includes a switching centre 10, which is connected to the public switched telephone network (PSTN) and to other data networks if required. The switching centre is typically one of a number of switching centres and a number of basestations 20 are connected to each switching centre. The main function of the basestations 20 is to establish a radio link 30 with a terminal 40, such as a mobile telephone, (or in the case of UMTS, the so-called user equipment (UE)), and therefore allow communication between the mobile terminal 40 and the rest of the system. Each basestation 20 is usually capable of supporting a plurality of such links 30 and therefore a plurality of mobile terminals 40. While the base stations 20 and the switching centre 10 are shown as separate components, this is for illustrative purposes only and various functions may be performed by the switching centre and/or base station depending on the implementation of the system, as will be appreciated by the person skilled in the art. A base station 20 is sometimes referred to as a fixed terminal, and in certain cases this terminology may be taken to include components such as the switching centre 10 or at least such functional components associated with the switching centre and other fixed infrastructure components. The basestations 20 and the terminals 40 are each provided with radio transmitting and receiving means for establishing the links 30. It is assumed that the radio link 30 is digital and furthermore may employ techniques such as Time Division Multiple Access (TDMA), Frequency Division Multiple Access (FDMA) or Code Division Multiple Access (CDMA).

In use, the quality of a link 30 established between the basestation 20 and the terminal 40 will vary considerably and the system must be tolerant of fluctuating link quality. Where digital information is being exchanged, as in the present example, this may result in the incorrect reception of digital information. Error correction techniques such as forward error correction (FEC) may be employed which can allow recovery of the correct information from the incorrectly received information. As the quality of the link 30 deteriorates further FEC techniques may not be adequate to recover the correct information and in this case there is no alternative but to initiate further transmissions for any incorrectly received information. These further transmissions may take a variety of forms although one practice is to employ ARQ schemes as mentioned earlier. In each case, regardless of the scheme chosen the further transmissions may be considered as the transmission of second information units that are associated in some way to (failed) previously transmitted first information units. As also mentioned above the further transmissions (of second information units) can involve a straightforward retransmission of information, (re)transmission of only a portion of the information, transmission of appropriate FEC information, transmission of enhanced FEC information or any reasonable combination thereof. However, for the purpose of illustrating the present invention, and by way of example only, the following specific description relates to a typical ARQ scheme where the transmission of second information units actually constitutes a repeat transmission of (failed) first transmission units.

Figure 3:
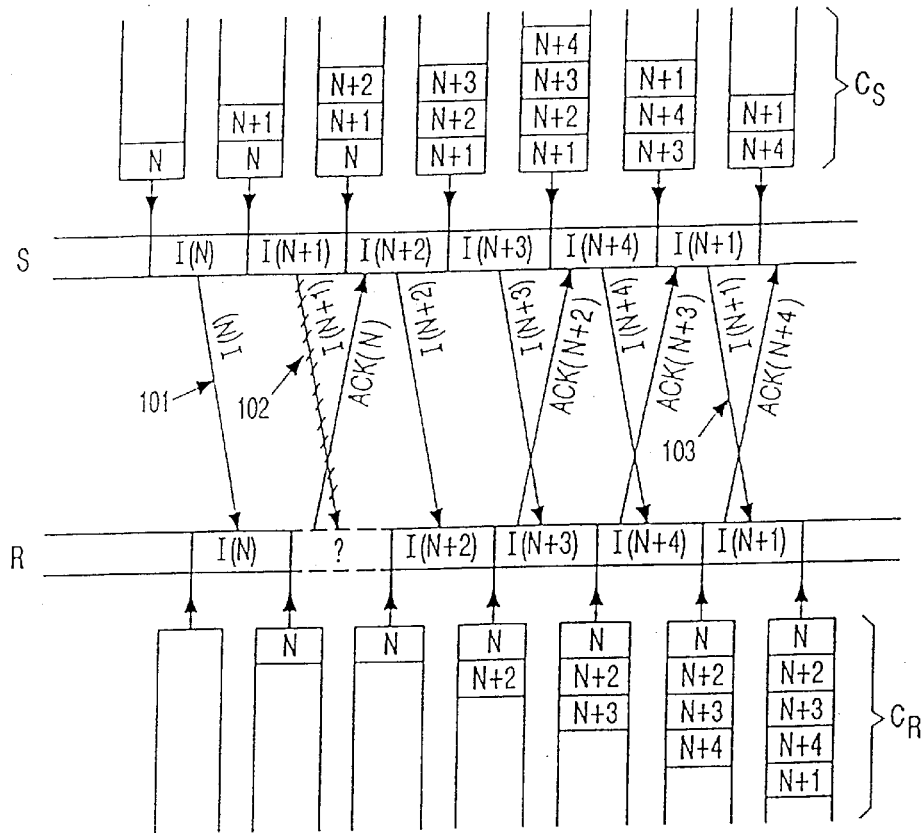
FIG. 3 illustrates the operation of a typical known automatic repeat request (ARQ) error control scheme.

The retransmission of information occurs without the intervention of a user and is therefore called an automatic repeat request (ARQ). By way of example only, a typical ARQ scheme may be understood by reference to FIG. 3 which shows the frame sequence of a so called selective RQ scheme ARQ implementation (where a frame is a unit of information transferred across the data link 30 of this example). This known scheme is discussed in more detail in the publication "Data Communications, Computer Networks and OSI" (second edition) at page 126–127 by Fred Halsall and published by the Addison-Wesley Publishing Company. Although information often flows in both directions across a link, FIG. 3 shows a situation where information is being sent from a sender (S) to a receiver (R) in the form of a number N of information frames I. Each transmitted frame contains a unique identifier which allows the sender S and the receiver R to keep track of individual frames. Both the sender and the receiver are provided with buffer storage space $C_S$ and $C_R$ respectively to record the frames that have been sent or received. When, for example, the frame I (N) denoted as 101 is transmitted by the sender S, this is recorded in the buffer $C_S$. Frames are sent continuously and the contents of $C_S$ form a (provisional) retransmission list. The receiver R returns an acknowledgement ACK to S for each correctly received frame and also records a list of correctly received frames in the buffer $C_R$. When the sender S receives acknowledgement ACK from the receiver R that a particular frame has been received correctly, sender S removes from the buffer $C_S$ the entry that corresponds to that acknowledged frame. Each I frame is coded to permit the receiver R to establish that the I frame is not corrupted. Various ways of doing this include the use of cyclic redundancy check (CRC) error checking. Now with further reference to FIG. 3, it is assumed that frame I (N+1) which is denoted as 102 becomes corrupted during transmission which is shown as a crossed line. This results in the absence of an acknowledgement for the I frame N+1 while acknowledgement ACK of the other illustrated frames N, N+2, N+3 . . . occurs normally. The sender S detects frame N+1 has not been acknowledged causing sender S to retransmit the frame as is denoted at 103. Depending upon the particular implementation of the ARQ scheme, subsequent retransmission may occur until correct receipt of a frame is acknowledged.

Where multiple retransmissions occur this can cause problems in certain systems. Firstly, multiple retransmissions may cause a significant delay. A second problem occurs in systems where large messages are transferred which are required to be broken into a number of frames. Because the frames must be reassembled in the correct order before the message can be recovered, this can require the use of large buffer storage space for temporary storage of frames received out of sequence. This is illustrated in the above example where frame (N+1) is retransmitted after transmission of frame (N+4). In order to recover the original message it is necessary for the receiver R to buffer the frames N+2, N+3 and N+4 which have been received out of sequence. Alternatively, or in addition to this buffering, the transmitter may buffer frames ready for retransmission.

Figure 4:
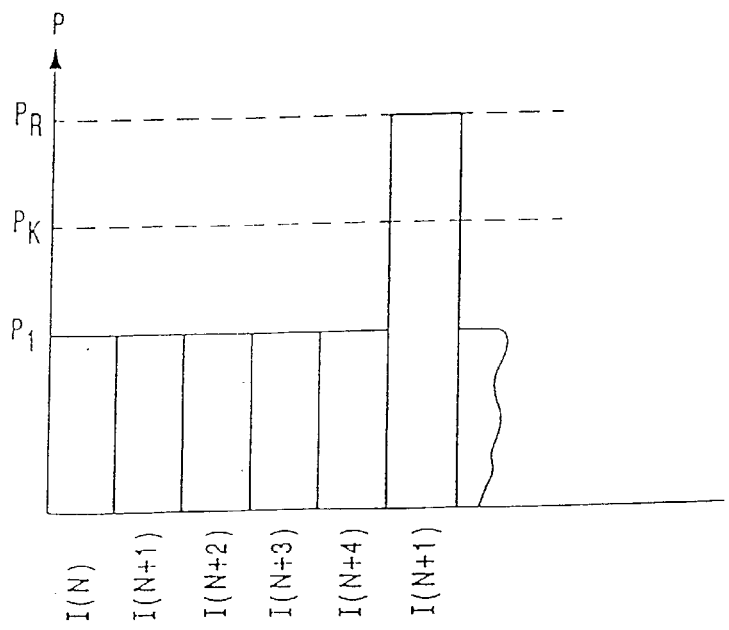
FIG. 4 illustrates the operation of an implementation of an error control scheme employing power control.

In data communication systems employing a physical link, such as a coaxial cable, incorrect transfer of information is frequently caused by spurious noise or collision of data, in which case simple retransmission of data is likely to be successful on the first attempt. However, in the case of a wireless communication link, such as that employed between a mobile terminal 40 and a basestation 20, incorrect transmission of information is often caused by a weak signal reaching the receiving end of the link. Furthermore this signal strength may be constantly varying due to a changing operating environment and in these situations a simple retransmission of incorrectly received information may be unsatisfactory. In this case, information that needs to be retransmitted may be sent over the link 30 with a transmission power that is greater than the transmission power used to transmit that information originally. This is illustrated in FIG. 4, which shows the same frame transmission sequence of FIG. 3 along the x-axis and transmission power on the y-axis. Frames are normally transmitted at power $P_1$ whereas retransmitted frames are transmitted at power $P_R$. This increases the probability of repeated information being successfully received on retransmission, especially under conditions where signal strength is weak or fading occurs. Furthermore the increased likelihood of successful communication resulting on the first retransmission allows a smaller buffer space to be employed in the transmitter and/or receiver for storing frames or a list of frames. The increased likelihood of successful communication resulting on the first retransmission can also result in reduced delay when sending the information, which is advantageous when carrying real time information such as video or audio. Benefits may also result when transmitting other types of information for which a transmission delay beyond a predetermined period is unacceptable. The power amplitude of the retransmitted frames (second information units) may, for example, be in the order of 3 dB higher than the power amplitude used for the initial transmission of the frames (first information units) although other amplitudes may be chosen to give different relative powers and the above value is not intended to limit the scope of the present invention.

Figure 2:
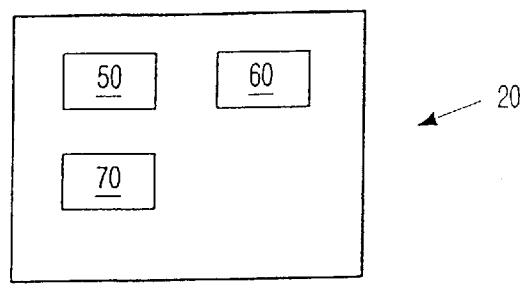
FIG. 2 is a schematic representation of components in a transmitter stage from the system of FIG. 1.

FIG. 2 shows components of the transmitter stage in a basestation 20 of the telecommunications system 1. A transmitter 50 transmits units of information as frames with a power that is governed by control means 60. In this example control means 60 is responsive to monitoring means 70. As stated above the transmitter 50 will output retransmitted information with a greater transmission power than the transmission power used to transmit that information originally. Although the transmitter 50, control means 60 and monitoring means 70 are shown together as components of the transmitter stage in the base station 20, this does not indicate a limitation. For example the monitoring means may be located away from the transmitter stage. In some cases the monitoring means may be located at the receiving end of the wireless link.

The above scheme allows retransmitted data to be successfully communicated with an increased level of confidence and this may be exploited in those applications where it is preferable that information should be successfully communicated by the first retransmission attempt. The transmission power levels for the first transmission attempt may be variable. For example it may be desirable to select this initial transmission power level $P_1$ such that a particular proportion of initial transmissions are likely to require retransmission (at the higher power level). Selection of the transmission power levels for the first transmission attempt will influence the proportion of retransmissions and thereby influence the average transmission power level. Lowering the initial transmission power will reduce the probability of information being successfully received. However, by using a low transmission power the power consumption of the transmitter will be reduced. The transmission power for the first attempt may in this way be used to control the average power consumption (which of course must take into account the transmissions at the higher power) of the transmitting circuitry, and preferably maintain a minimum average power consumption. Obviously, certain applications will be more tolerant than others to the occurrence of retransmissions and a balance needs to be established based on the relative importance of power saving versus the occurrence of retransmission. Indeed, excessive retransmission may give rise to a greater average power consumption than would occur if choosing to initially transmit at a higher power level thus reducing the number of retransmissions. The present arrangement is primarily intended for use in the transmission of traffic, which may for example be user video, voice, or file data and the requirements for transmitting various types of traffic will be known to the person skilled in the art. An overall reduction in transmission power reduces power consumption. This is of particular benefit when an exhaustible power source, such as a battery is being used. In certain implementations it may be desirable to impose a limitation on the number of retransmissions that are permitted in the interest of power saving and/or limiting transmission delay.

This power saving feature is also illustrated in FIG. 4. Information is initially transmitted at power $P_1$ which is below the power $P_k$ that would be used for transmission and retransmission in a system not benefiting from the present scheme. As will be noted, the re-transmitted information, in this case I frame (N+1), is re-transmitted at power $P_R$ which is greater than $P_1$. In this case, $P_R$ is also greater than $P_K$ although this is not mandatory. The reduction in overall power consumption may be exploited to provide a number of benefits such as extended operating time in the case of battery powered equipment, the use of smaller lighter batteries or the use of more economical battery technology.

In the receiver, the information actually received by virtue of each of the transmitted and associated re-transmitted frames may be combined in order to improve the probability of correct reception of the message carried by that information. Such combination may be done at the symbol level using maximum ratio combining (although other combination techniques may be used). Maximum ratio combining is where appropriate scaling factors are applied individually to each received frame of data when combining, so as to maximise the overall signal to noise ratio (or signal to interference ratio) of the combined information. For a given piece of information being communicated over a link, there will in general be a relationship between the total energy transmitted (that is the energy that is obtained by summing the transmit energy of the first frame and the transmit energy of each associated subsequent retransmitted frame) and the probability of correct reception. If it is desirable to minimise interference to other users of the system, the total energy of the transmissions should be controlled with the aim that no more energy is transmitted in total than is needed to receive the message correctly. One way of doing this is to select the initial transmission power on the basis of estimates of path loss and noise and interference at the receiver. Then if the first transmission fails, it can be arranged that the total energy is progressively increased with each subsequent re-transmission. Then, when the total energy actually received is sufficient to achieve the required SNR (or SIR), with those ratios being calculated for the initial transmission and associated retransmissions when combined overall, the information can be correctly decoded. As an example, consider the case where the total energy up to and including the nth transmission is set to be $E.k^{n-1}$, where E is the energy of the first transmission, and k is a constant. If the total energy is to increase, then k must be greater than unity. Then the energy of the nth transmission (for n>1) should be $E.k^{n-1}-E.k^{n-2}$. If k is close to one, then the total energy would be increased in small steps until the SNR (or SIR) is sufficient for correct reception. This means that there is a low probability of sending too much energy. In practice a large number of re-transmissions would undesirable, due to the required signalling overhead. Therefore, the choice of k would be a compromise between number of re-transmissions and the accuracy with which the required SNR can be reached, based on a knowledge of the likely errors in the estimates of the path loss and interference at the receiver. A suitable choice of k might be 1.4, in which case the sequence of relative energies for the first few transmissions would be approximately {1.0, 0.4, 0.6, 0.8, 1.2 . . . }.

The above scheme can be contrasted with the prior art, in which the retransmissions would be sent with equal power, so that the total energy after the nth transmission would be nE. This gives a relatively large step in total energy between the first and second transmissions, with progressively reducing energy increments subsequently.

It is mentioned for the avoidance of doubt that references to the term signal to noise ratio and signal to interference ratio are used interchangeably and reference to one of these terms may be taken to mean a reference to that term, a reference to the other one term or a combination of both such ratios.

The energy of a re-transmission could conveniently be determined by setting the transmit power, but other methods might be used for example by changing the modulation scheme, or spreading factor in a CDMA scheme, as described in our pending UK patent applications GB0024698.3 (applicants reference PHGB000140) filed on 9th Oct. 2000, entitled "Method for the communication of information and apparatus employing the method", claiming priority from GB0020597.1 (applicants reference PHGB000115) filed on 21st Aug. 2000. These methods might be used separately or in combination.

The above description relates primarily to a system in which any retransmitted information is substantially the same as in the first transmission. However, there are other possibilities. For example, the re-transmission may comprise additional redundancy. In this case it would be possible to arrange for the total amount of redundant information to progressively increase by a given amount. This is equivalent to a progressive decrease in the code rate. So if the effective code rate after the nth transmission is to be $R.k^{1-n}$, where R is the initial code rate, then the amount of additional redundancy to be added at the nth transmission should be $B.k^{n-1}-B.k^{n-2}$ where B is the total number of bits sent in the first transmission. If the same amount of additional redundancy in each re-transmission is the same as the number of bits in the first transmission, then the code rate at the nth transmission is R/n.

In some situations, for example with a fading channel and closed-loop power control, it may be beneficial to consider a parameter of the received signal energy instead of the transmit power. Specifically, the target SIR may be adjusted for each retransmission so as to give an exponential increase in total received signal energy according to a similar formula to that described above for the transmit energy, or the target SIR for each retransmission may be adjusted so as to give an exponential increase in total SIR.

A further technique may be applied in systems which employ simultaneous control and data channels. The closed loop power control and SIR target may apply to the control channel, with the transmit power for the data channel being determined by scaling from the transmit power of the control channel. In such situations, the scaling factor may be adjusted between each retransmission according to a similar formula to that described above. For example, if the scaling factor for the first transmission is S, then the scaling factor for the $n^{th}$ retransmission would be given by $S.k^{n-1}$–$S.k^{n-2}$.

It would also be possible to use a combination of these methods, for example adjusting the SIR target between retransmissions as well as adjusting the scaling of transmit power between the control and data channels.

Now that the basic concept of using a different transmission power for repeat transmissions has been explained, operation in accordance with the present invention may be governed by the use of a closed loop power control. In a system with closed loop power control, such as UMTS when operating in the frequency division duplex (FDD) mode, it is proposed that transmission power, for the retransmissions at least, should be governed with reference to at least one parameter indicative of the quality of received transmissions at the receiving end of the link. One such parameter is the signal to interference (SIR) ratio. Transmission power may be adjusted as necessary such that the required SIR ratio (the 'target' SIR ratio) is achieved in transmissions detected by the receiver. In order to bring about a change in transmission power for repeat transmissions in comparison with original transmissions, it is possible to raise or lower the target SIR ratio at the receiver for any re-transmissions in comparison with the target SIR set at the receiver for the original transmissions. This change in target SIR setting may be done by explicit signalling between the fixed terminal and mobile terminal or under control of the physical layer. One procedure for setting the target SIR already exists, and is defined in the current version of the UMTS specification 3G TS25.433v3.2.0 "UTRAN lub Interface NBAP signalling" section 8.2.17 the teaching of which is incorporated herein by reference.

In a system like UMTS, the transmit power levels of information carried on the control and data channels can be different. Therefore the power of data re-transmissions may also be effectively adjusted by changing the ratio of transmission power between the data information in the data channel and pilot information in the control channel. Furthermore, the received condition of pilot information which is transmitted as part of the control information may be used in power control operations.

In the case of a UMTS uplink (UL), a closed-loop power control procedure is employed for uplink Dedicated Channels (DCH). This procedure is specified in the current version of the UMTS specification 3GTS25.214v3.3.0 "Physical Layer Procedures (FDD)" section 5.1.2 the teaching of which is incorporated herein by reference. The procedure can be further subdivided into two processes which operate in parallel: outer-loop power control and inner-loop power control.

The outer-loop power control for the uplink operates within the base station (BS), and is responsible for setting a target SIR of transmissions as received at the BS from each UE. This target is set on an individual basis for each UE, according to the required BLock Error Rate (BLER) of the decoded data received from that UE. Generally, if it is required that the error rate of received, decoded data should be low, then it will be necessary for the SIR of received undecoded transmissions to be relatively high. In applications where a higher error rate in decoded data is permissible, it will be acceptable to receive transmissions having a lower SIR. The required BLER will depend on the particular service which is being carried, and therefore could, for example, be higher for a data service than for a voice service. The outer-loop power control will adjust the SIR target until the required BLER is matched. The SIR can be calculated by the reception of known pilot information.

The inner-loop power control mechanism controls the transmitted power of the UE in order to counteract the fading of the radio channel and meet the SIR target at the BS set by the outer-loop.

If the inner-loop power control fails to counteract adequately the fades in the channel, the BLER will increase and the outer-loop power control will increase the SIR target, so that the average received SIR from the UE is increased.

The BS compares the received SIR from the UE with the target once every time-slot (0.666 ms). If the received SIR is greater than the target SIR, the BS transmits a TPC ("Transmit Power Control") command "0" to the UE via the downlink dedicated control channel. Such a command instructs the transmitter to reduce transmitting power. If the received SIR is below the target, the BS transmits a TPC command "1" to the UE. Such a command instructs the transmitter to increase transmitting power.

In the case of a UMTS downlink, inner and outer loop power control acts on dedicated channels in a similar way to the uplink.

Further information on uplink and downlink power control system employed in UMTS may be found in the paper entitled "Power control in UMTS release '99" M P J Baker, T J Moulsley IEEE 3G2000 Mobile Communication Technologies Conference 27th–29th Mar. 2000 (London), published as International Conference on 3G 2000 "Mobile Communication Technologies", 27–29 Mar. 2000 London UK, pp 36–40, the teaching of which is incorporated herein by way of reference.

In a specific arrangement proposed here, the DSCH (Downlink Shared Channel) can be used to send packet data on the downlink. A pair of DCH (Dedicated Channels) would be used in uplink and downlink to support functions such as signalling and power control. If a packet is received in error by the UE, then the target SIR at the UE used by the downlink power control loop can be changed. The new SIR has the effect that the UE requests that the network (via closed loop inner power control) should transmit with a different power. This new target would apply until the packet is received correctly, at which point the target SIR could be restored to its original value.

Figure 5:
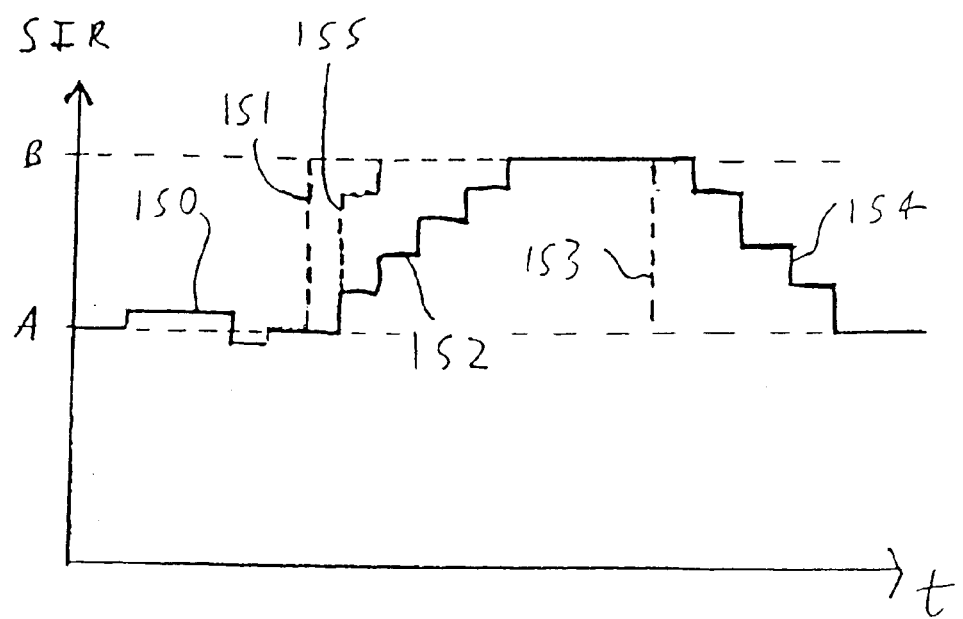
FIG. 5 shows transmission power with respect to time of apparatus operating in accordance with the present invention.

Such operation is illustrated in FIG. 5 which shows SIR on the y-axis versus time on the x-axis. The solid line 150 shows the received SIR value. For the first transmission of information units, the target SIR is set at value A. The actual received SIR value can fluctuate (for a number of reasons as have already been discussed above). In order to compensate for such fluctuations, the inner loop power control adjusts the transmission power in order to achieve the required SIR ratio A. In order to compensate for such fluctuations the closed loop power control is employed such that the receiver sends transmit power 'up' or power 'down' TPC commands to the transmitter such that the received SIR will be centred on the target SIR value A.

Now assuming that reception of first transmission units has failed, the receiver sends such an indication to the transmitter, which may be in the form of a negative acknowledgement command (NACK) or the lack of a positive acknowledgement command (ACK) depending on the form of ARQ scheme being used, as will be appreciated by the person skilled in the art. Consider the example of a scheme where the received first information units are discarded if received in error. The receiver also now raises the target SIR to a value B which is higher than the target SIR value A. This is denoted in FIG. 5 at 151. The SIR value of received transmissions is below the target SIR B which causes the receiver to send power 'up' commands to the transmitter, which commands are sent until the new target SIR B is reached. This is shown in FIG. 5 at 152. The higher target SIR B is maintained until the retransmission successfully communicates the failed data to the receiver. On acknowledgement of correct reception of the information units, the receiver sets the target SIR to the lower value A, as is denoted at 153. Since the SIR value of received transmissions is now above the target SIR, the receiver will send power 'down' commands to the transmitter, which commands are sent until the target SIR A is reached by the actual SIR value of received signals. This is shown in FIG. 5 at 154.

The same principle may be employed on the uplink communications. The change in SIR target may also be instructed or requested by the transmitting station.

Operation becomes be more complex if additional packets are sent before the erroneous one is re-transmitted, requiring the use of buffers and means for correctly sorting received packets of data. One way to simplify operation is to fix or restrict the delay of any re-transmissions, so that the target SIR could be raised at the correct time (or approximately the correct time).

If the first information units are not discarded, but are combined with any retransmitted information, then the required quality target might become the SIR of the combination. Suitable combination techniques are already known, for example this may be done symbol-by-symbol or bit-by-bit using soft decision information. This required SIR target might therefore be reached with a lower power for the re-transmissions than the first transmission. In this case, the energy in the retransmitted information would only need to be sufficient to make up the difference between the received SIR of the first transmission and the SIR target for correct reception.

In addition to the above mechanism of setting the target SIR and relying solely on the inner loop power control to cause a variation in transmission power, it may be possible to also apply an initial power change at the onset of re-transmissions, so that the new target SIR is reached more quickly. This is denoted in FIG. 5 as 155, which shows the new SIR value B being reached more quickly, relying on fewer inner loop power control cycles to reach the required SIR.

The above principle may also be applied to communications performed using other channels of the UMTS system, with appropriate modifications where necessary, as will be appreciated by the person skilled in the art.

The present invention may be implemented having regard to the requirements of the particular application. In applications where occasional transmission errors are tolerable it may be possible to reduce significantly the initial transmission power or quality of reception parameter (for example SIR target) causing a large reduction in the power consumption, placing reliance on the fact that successful transmission is likely on repeat transmission. In applications where a saving in power consumption needs to be balanced with the avoidance of unnecessary re-transmission, the initial transmission power is not reduced to the same extent.

Although the present invention is described with reference to a mobile cellular radio telephone system and so-called third generation mobile telecommunications systems, other applications include other cordless telephone systems and wireless LANs (for example Hiperlan), et cetera.

Variations on the basic scheme may include increasing the retransmission power or quality of reception parameter (for example SIR target) only after the first or a plurality of initial retransmission attempts have failed, thus providing greater scope for a reduction in power consumption.

Another variation on the basic scheme is to provide a progressive power increase for information that is retransmitted more than once. For example, the target SIR could be increased progressively until the information is successfully received. This further reduces the probability of unsuccessfully transmitted information being further delayed as a result of multiple retransmissions. In the general case there could be a pre-determined sequence of SIR values depending on the number of retransmissions. In some cases it may be desirable to limit the maximum allowable number of retransmission attempts for a given initial transmission.

It may also be desirable to apply a limit to the transmission power of any re-transmissions, which limit may be the same as or different to any maximum power restriction applied to the first transmission.

The present invention may be used in conjunction with the concept of transmitting second transmission units on a carrier modulated with a modulation scheme different to the modulation scheme used for transmitting the first transmission units, which is the subject of our pending UK patent application GB0024698.3 (applicants reference PHGB000140) filed on 9th Oct. 2000 in the name of Koninklijke Philips Electronics N.V. entitled "Method for the communication of information and apparatus employing the method", claiming priority from GB0020597.1 (applicants reference PHGB000115) filed on 9th Aug. 2000. Those applications also relates to the concept of changing spreading factor applied to data transmitted and to using a different communications link bandwidth between first and second information unit transmissions.

The present invention may be used in conjunction with the concept of transmitting second transmission units at a greater power level, as is the subject of our pending UK patent application GB0024699.1 (applicants reference PHGB000139) filed on 9th Oct. 2000 in the name of Koninklijke Philips Electronics NV entitled "Method for the communication of information and apparatus employing the method", claiming priority from GB0020599.7 (applicants reference PHGB000113) filed on 21st Aug. 2000.

Whilst the present invention offers direct advantages in terms of reliable communication of information and a reduction in power consumption, other indirect advantages may be enjoyed through the correct implementation of the present invention. A lower initial (hence average) transmission power can result in reduced interference with other transmissions. An example of this in a cellular system would be observed as a reduction in overall co-channel interference (and a possible reduction in other types of interference) since the duration of the high power transmissions is relatively short. This can result in less interference to other users.

Although the present invention has been described with reference to known ARQ schemes this is not intended to indicate any limitation. As described the present invention may be primarily considered as a special ARQ scheme in which case the information is generally digital data organised into frames or packets. In this case the invention may be considered as an automatic repeat request error control scheme wherein transmitted data frames or packets which are deemed to have been unsuccessfully communicated are complemented with further transmissions at a power level different to the power used to transmit the data frames or packets originally, or aiming to achieve a quality of reception parameter (for example SIR ratio) greater than that achieved for the transmission of the data frames or packets originally. The present invention is also in keeping with techniques where first and subsequent transmissions or retransmissions may be combined to recover information. In such techniques it may be preferable to employ some type of averaging, and in this case may also be preferable to give more "weight" to information transmitted at a higher power or received with a higher quality of reception parameter. While the present invention will be of greatest use over a wireless radio link, it may also in principle be implemented in systems employing links of other mediums, for example coaxial cable, twisted pairs and so on, although the issue of power consumption is normally of minor importance in wired communication links. Furthermore, although the present invention has been described with reference to an example employing transmission between a fixed terminal and a portable terminal, it will be apparent to the person skilled in the art that the present invention is not so limited in application. That is the present invention may be employed in the transfer of information in either direction over a communications link or in both directions, irrespective of the fact that the transmitting station and/or receiving station is fixed or mobile. It will also be apparent to the person skilled in the art that in a two way communications system a transmitting station may be combined with a receiving station.

From reading the present disclosure, other modifications will be apparent to persons skilled in the art. Such modifications may involve other features which are already known in the design, manufacture and use of systems and devices and component parts thereof and which may be used instead of or in addition to features already described herein.

What is claimed is:

1. A method of transferring information in units over a wireless digital communications link between a transmitting station and a receiving station, the method comprising:
   transmitting first information units at a first energy level;
   monitoring if correct reception of the transmitted units occurred; and
   transmitting second information units associated with the first information units, for which first information units the monitoring did not indicate correct reception occurred, at second energy levels, the second information units allowing the content of the first information units to be established,
      wherein at least one of the associated second information units is transmitted at an energy level which is selected at least partly so as to minimize the total transmitted energy when averaged over a series of first information unit transmissions with respective second information unit transmissions.

2. The method of claim 1 wherein at least one of the second information units is transmitted with an energy level below the energy level used in transmission of the first information units.

3. The method of claim 1, further comprising:
   combining first information units received at the receiving station and associated second information units received at the receiving station so that the received energy of each second information unit transmissions supplements the received energy of the first and any previous second information unit transmissions, the step of combining being performed such that the total energy of the combined received transmissions increases with each second information unit transmission event.

4. The method of claim 1 wherein, for a given first information unit transmission, associated consecutive second information unit transmission events are performed with a progressive increase in transmission energy with respect to one another.

5. The method of claim 1 wherein the first and any associated consecutive second information unit transmission events are each performed with a transmission energy such that the total transmission energy obtained by combining the first and any second information unit transmission events increases in value substantially exponentially.

6. The method of claim 1 wherein the first and any associated consecutive second information unit transmission events are each performed with a transmission energy such that the total transmission energy obtained by combining the first and any second information unit transmission events substantially conforms to the expression $E.k^{n-1}$ where E is the transmission energy used for the first information unit transmission event, k is a constant and n is the individual information unit transmission event where n=1 in the case of the first information unit transmission event and n=2, 3, 4, . . . n for each consecutive second information unit transmission event respectively.

7. The method of claim 6 wherein k=1.4.

8. The method of claim 1 wherein, for each second information unit transmission event, the second information units are transmitted with second energy levels selected partly on the basis of a target quality of reception parameter for each said second information unit.

9. The method of claim 8 wherein said target quality of reception parameter for each second information unit is calculated as a function of at least one previous target or actual quality of reception parameter.

10. The method of claim 9 wherein said target quality of reception parameter for each second information unit is also calculated as a function of the energy received due to transmission of the information units.

11. The method of claim 8, further comprising:
   analyzing the disparity between the actual and target quality of reception parameters of received information unit transmissions and decreasing the information unit transmission power level during transmission of said information unit if the quality of reception parameter for said received information unit transmission is greater than the target quality of reception parameter, otherwise increasing the information unit transmission power level during transmission of said information unit if the quality of reception parameter for said received information unit transmission is less than the target quality of reception parameter.

12. The method of claim 1 wherein the communications link is established by equipment operating in accordance with a communications protocol based on the Universal Mobile Telecommunication System.

13. The method of claim 12 wherein the receiving station sends transmission power regulation commands to the transmitting station in the transmit power control (TPC) field carried on a control channel set up in the communications link.

14. The method of claim 8, wherein the target quality of reception parameter for first information units is selected to correspond to a defined probability of failed first information units transmission and consequent second information units transmission.

15. A digital wireless communication system, comprising:
at least one transmitter having means for transmitting first information units at a first power level;
at least one receiver having means for receiving the transmitted information units;
monitoring means for monitoring if correct reception of the transmitted units occurred;
wherein the transmitting means transmits second information units associated with the first information units, for which first information units the monitoring did not indicate correct reception occurred, at second energy levels, the second information units allowing the content of the first information units to be established; and
wherein at least one of the associated second information units is transmitted at an energy level which is selected at least partly so as to minimize the total transmitted energy when averaged over a series of first information unit transmissions with respective second information unit transmissions.

16. A transmitter station for digital wireless transmission of traffic information to a receiver, said transmitter station comprising:
a transmitter for transmitting first information units at a first energy level;
monitoring means for monitoring if correct reception of the transmitted units occurred;
wherein the transmitter transmits second information units associated with the first information units, for which first information units the monitoring means did not indicate correct reception occurred, at second energy levels, the second information units allowing the content of the first information units to be established; and
wherein at least one of the associated second information units is transmitted at an energy level which is selected at least partly so as to minimize the total transmitted energy when averaged over a series of first information unit transmissions with respective second information unit transmissions.

17. A receiver for use in a digital wireless communication system including at least one transmitter having means for transmitting first information units at a first power level; the receiver comprising:
means for receiving the transmitted information units;
monitoring means for monitoring if correct reception of the transmitted units occurred;
wherein the transmitting means transmits second information units associated with the first information units, for which first information units the monitoring did not indicate correct reception occurred, at second energy levels, the second information units allowing the content of the first information units to be established; and
wherein at least one of the associated second information units is transmitted at an energy level which is selected at least partly so as to minimize the total transmitted energy when averaged over a series of first information unit transmissions with respective second information unit transmissions.

18. A method of transferring information in units over a wireless digital communications link between a transmitting station and a receiving station, the method comprising:
transmitting first information units with a first redundancy content;
monitoring if correct reception of the transmitted units occurred; and
transmitting second information units associated with the first information units, for which first information units the monitoring did not indicate correct reception occurred, with a second redundancy content, the second information units allowing the content of the first information units to be established,
wherein at least one of the associated second information units is transmitted with a data redundancy content which is selected at least partly so as to minimize the total redundant data content when averaged over a series of first information unit transmissions with respective second information unit transmissions.

19. The method of claim 18 wherein at least one of the second information units is transmitted with a data redundancy content below the redundant data content level used in transmission of the first information units.

20. The method of claim 18, further comprising:
combining first information units received at the receiving station and associated second information units received at the receiving station.

21. The method of claim 18, wherein for a given first information unit transmission, associated consecutive second information unit transmission events are performed with a progressive increase in redundant data content with respect to one another.

22. The method of claim 18, wherein the first and any associated consecutive second information unit transmission events are each performed with a redundancy data content such that the total redundancy data content obtained by combining the first and any second information unit transmission events increases in value substantially exponentially.

23. A digital wireless communication system, comprising:
at least one transmitter having means for transmitting first information units with a first redundancy content;
at least one receiver having means for receiving the transmitted information units;
monitoring means for monitoring if correct reception of the transmitted units occurred;
wherein the transmitting means transmits second information units associated with the first information units, for which first information units the monitoring did not indicate correct reception occurred, with a second redundancy content, the second information units allowing the content of the first information units to be established; and
wherein at least one of the associated second information units is transmitted with a data redundancy content which is selected at least partly so as to minimise the total redundant data content when averaged over a series of first information unit transmissions with respective second information unit transmissions.

24. A transmitter station for digital wireless transmission of traffic information to a receiver, said transmitter station comprising:
a transmitter for transmitting first information units with a first redundancy content;
monitoring means for monitoring if correct reception of the transmitted units occurred;
wherein the transmitter transmits second information units associated with the first information units, for which first information units the monitoring means did not indicate correct reception occurred, with a second redundancy content, the second information units allowing the content of the first information units to be established; and wherein at least one of the associated second information units is transmitted with a data redundancy content which is selected at least partly so as to minimize the total redundant data content when averaged over a series of first information unit transmissions with respective second information unit transmissions.

25. A receiver for use in a digital wireless communication system including at least one transmitter having means for transmitting first information units with a first redundancy content, the receiver comprising:

means for receiving the transmitted information units; and monitoring means for monitoring if correct reception of the transmitted units occurred;

wherein the transmitting means transmits second information units associated with the first information units, for which first information units the monitoring did not indicate correct reception occurred, with a second redundancy content, the second information units allowing the content of the first information units to be established; and wherein at least one of the associated second information units is transmitted with a data redundancy content which is selected at least partly so as to minimize the total redundant data content when averaged over a series of first information unit transmissions with respective second information unit transmissions.

* * * * *